United States Patent
Fredericksen et al.

(10) Patent No.: US 7,455,534 B1
(45) Date of Patent: Nov. 25, 2008

(54) APPARATUS FOR GROUNDING ONE OR MORE CABLES

(75) Inventors: Ross T. Fredericksen, Mantorville, MN (US); Don A. Gilliland, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/776,931

(22) Filed: Jul. 12, 2007

(51) Int. Cl.
*H01R 13/648* (2006.01)

(52) U.S. Cl. .............................. 439/95; 439/608; 439/92
(58) Field of Classification Search ................... 439/95, 439/608, 92
See application file for complete search history.

(56) References Cited

U.S. PATENT DOCUMENTS

| | | | |
|---|---|---|---|
| 3,246,208 A * | 4/1966 | Ross et al. | 361/805 |
| 3,587,028 A * | 6/1971 | Uberbacher | 439/49 |
| 6,428,358 B1 * | 8/2002 | Figueroa et al. | 439/608 |
| 6,971,916 B2 * | 12/2005 | Tokunaga | 439/608 |
| 7,059,875 B2 * | 6/2006 | Kunimoto | 439/95 |
| 7,373,759 B1 * | 5/2008 | Simmons | 52/220.5 |
| 2004/0020278 A1 * | 2/2004 | McGarvey et al. | 73/86 |
| 2005/0215120 A1 * | 9/2005 | Tokunaga | 439/608 |

* cited by examiner

*Primary Examiner*—Tho D. Ta
*Assistant Examiner*—Vanessa Girardi
(74) *Attorney, Agent, or Firm*—Cantor Colburn LLP

(57) ABSTRACT

An apparatus is provided for grounding one or more cables, each cable having a cable jacket surrounding an electrically conductive layer that includes an exposed portion not covered by the cable jacket. The apparatus comprises an electrically conductive enclosure coupled to a ground potential and having an opening therethrough, a plurality of electrical conductors disposed across the opening to form a lattice, and an electrically conductive connection. The lattice is configured to receive the one or more cables therethrough such that the exposed portion of the electrically conductive layer of each cable makes electrical contact with at least one of the electrical conductors. The connection is electrical coupled to the lattice and the enclosure such that the electrically conductive layer of each cable received through the lattice is electrically coupled to the ground potential through the lattice, the connection, and the enclosure.

12 Claims, 6 Drawing Sheets

APPARATUS FOR GROUNDING ONE OR MORE CABLES

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

This invention relates to an apparatus for grounding one or more cables.

Cable assemblies are used to couple various types of electrical components, such as computer systems, peripheral devices, storage systems, servers, and routers, for transmission of electrical signals. Modern electronic devices operate at high frequencies, with signals transferring data and control information being communicated over the cables. The cables serve to isolate the multiple electrical leads that carry the signals, and electrical connectors also help to provide a solid electrical connection from the electrical leads of one cable to an electrical component or another cable.

A common issue associated with the use of cables and electrical connectors is electromagnetic compatibility (EMC). Sources such as other electrical components, power supplies, and the like that are located near or adjacent the electrical connectors, when operated, will generate emissions that include electromagnetic radiation. These emissions may travel through the air and be received by the cabling between electrical components, which may then conduct the emissions to associated electrical components. These emissions may be particularly inconvenient when the resulting interference disrupts, distorts, or otherwise limits or degrades operation of the associated equipment. For example, with regard to signal transmission for audio or video signals, such emissions may interfere with the signal resulting in degraded sound or pictures. Thus, to provide reliable operation, the connections between electronic devices should be designed so that electromagnetic emissions from one device do not interfere with the proper operation of another.

At higher speeds, the rise and fall times of signals are decreased, which leads to increased radiated emissions at higher frequencies. As a result, conventional techniques may not provide sufficient shielding effectiveness and high-frequency current may leak from connectors. The problem of radiated emissions from "leaky" connectors is exacerbated when a large number of such connectors are placed in close proximity to each other, which can occur in systems that utilize multiple electronic rack subsystems having an increased number of nodes and electronic devices. Such systems of multiple racks are widely used throughout the telecommunications, computing, audio, and entertainment industries, and the cabling between the racks, if not grounded, serves to break the shielding effectiveness of each individual rack, thereby allowing emissions from one rack to invade adjacent racks. Thus, as operating speeds continue to increase, and the density of electronic equipment and corresponding connectors increases, protection from radiated emissions provided by conventional shielding designs may not be adequate for satisfactory operation, and the various electrical components of one subsystem may still be affected by the electromagnetic radiation emitted from another subsystem.

Considering the above limitations, the inventors herein have identified a need for an apparatus for grounding a shielded cable that is effective to shield from and to eliminate undesirable emissions from cables as they pass between the electrical components of one electronic subsystem to the electrical components of other electronic subsystems, as well as being easy to manufacture and simple to assemble.

SUMMARY OF THE INVENTION

Exemplary embodiments of the present invention relate to an apparatus for grounding one or more cables, each cable having a cable jacket surrounding an electrically conductive layer that includes an exposed portion not covered by the cable jacket. The apparatus comprises an electrically conductive enclosure coupled to a ground potential and having an opening therethrough, a plurality of electrical conductors disposed across the opening to form a lattice, and an electrically conductive connection. The lattice is configured to receive the one or more cables therethrough such that the exposed portion of the electrically conductive layer of each cable makes electrical contact with at least one of the electrical conductors. The connection is electrical coupled to the lattice and the enclosure such that the electrically conductive layer of each cable received through the lattice is electrically coupled to the ground potential through the lattice, the connection, and the enclosure.

Exemplary embodiments of the present invention also relate to a method for grounding a cable in which the cable has a cable jacket, an electrically conductive layer surrounded by the cable jacket, and at least one electrical lead surrounded by the electrically conductive layer. The method comprises removing a portion of the cable jacket from the cable to expose a portion of the electrically conductive layer. The method further comprises placing the cable through a lattice formed by a plurality of electrical conductors disposed across an opening such that the exposed portion of the electrically conductive layer of the cable makes electrical contact with at least one of the electrical conductors of the lattice. The opening is formed in an electrically conductive enclosure that is coupled to a ground potential. The lattice and the enclosure are electrically coupled by an electrically conductive connection such that the electrically conductive layer of each cable received through the lattice is electrically coupled to the ground potential through the lattice, the connection, and the enclosure.

DETAILED DESCRIPTION OF THE INVENTION

Figure 1:
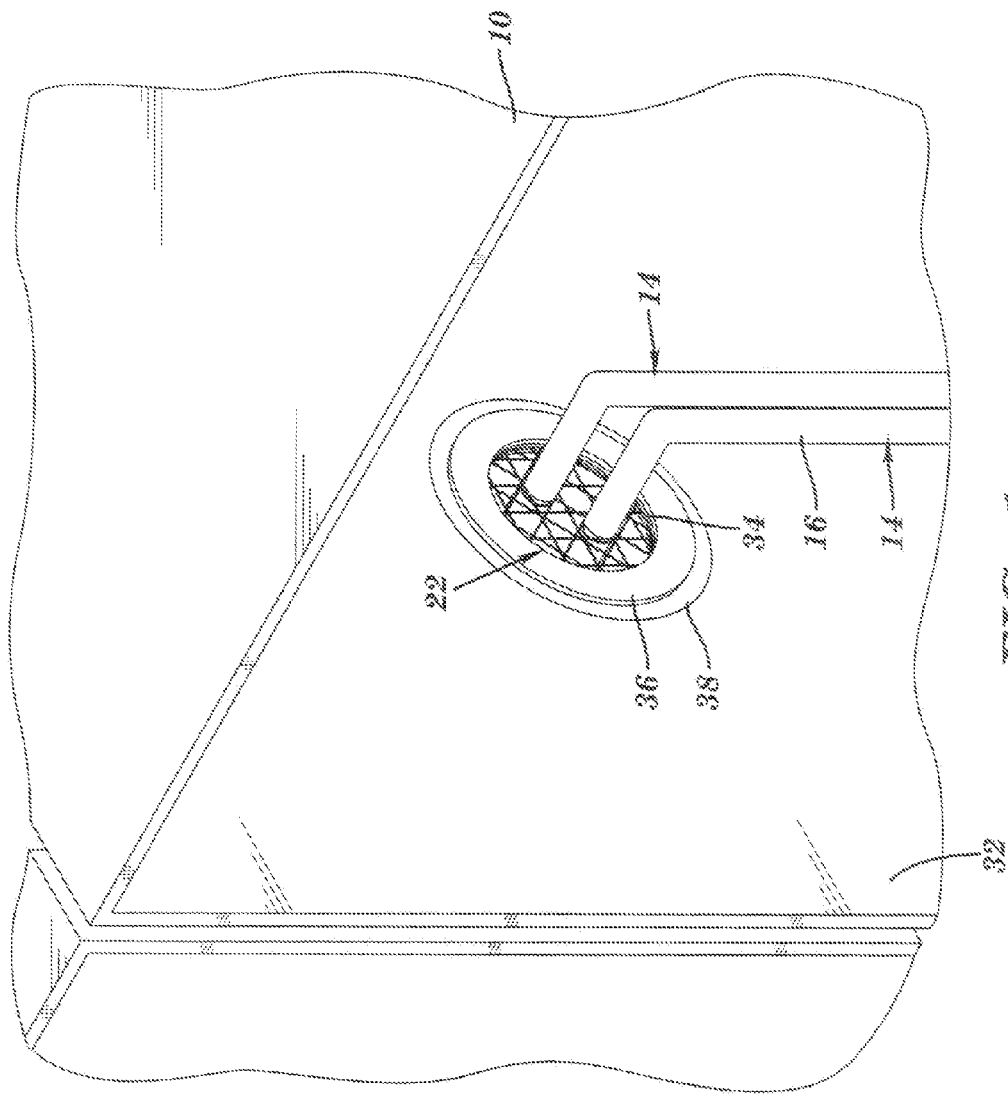
FIG. 1 is a perspective view of a grounding enclosure having cables passing therethrough in accordance with an exemplary embodiment of the present invention.

The present invention will now be described in more detail by way of example with reference to the exemplary embodiments shown in the accompanying figures. Exemplary embodiments of the present invention provide a grounding apparatus for a shielded cable that uses a lattice or mesh (or screen) of electrical conductors to couple (that is, electrically connect) a grounded enclosure to one or more shielded cables passing between adjacent rack subsystems. It should be kept in mind that the following described embodiments are only presented by way of example and should not be construed as limiting the inventive concept to any particular physical configuration. Further, and if used and unless otherwise stated, the terms "upper", "lower", "front", "back", "over", "under", and similar such terms are not to be construed as limiting the invention to a particular orientation. Instead, these terms are used only on a relative basis.

Referring now to FIGS. 1-6, an exemplary embodiment of a conductive enclosure 10 that is adapted to electrically couple contact a conductive shield 12 of one or more cables 14 passing therethrough to a ground potential is provided. Each cable 14 will typically have a conductive shield 12 surrounding one or more internal conductive signal lead wires (not shown) that are, in turn, each surrounded by an insulation layer. Shield 12 can be formed from, for example, wire mesh, circumferentially laid foil, or a combination of both. Shield 12 serves as a shield against EMC emissions for cable 14 and, in exemplary embodiments, can comprise stainless steel, aluminum, or tinned copper, although other conductive materials may also be employed. An outer insulating jacket 16, which can comprise an insulator material such as, for example, a plastic or a rubber, covers conductive shield 12. In some non-limiting exemplary embodiments, jacket 16 may also be connected to an outer contact sleeve.

One end of each cable 14 can be connected to an electrical component (not shown), such as a system server, that is disposed within an electronic rack subsystem, such as a standard 19-inch rack for mounting computers and other electronic devices and modules in a vertical frame. An opening 22 formed in enclosure 10 provides a continuous passage for routing each cable 14 through the enclosure, and each cable can have another end connected, for example, to another electrical component (not shown) that is disposed in an adjacent rack.

In the present exemplary embodiment, enclosure 10 is formed as an electrical cabinet having a parallelepiped shape, such as, for example, an Electronic Industries Alliance standard 19-inch rackmount cabinet, and used for housing and accommodating multiple rack subsystems of electrical or electronic equipment. Opening 22 is formed in enclosure 10 through one of the walls such as, for example, a side wall 32 as shown in FIG. 1. In exemplary embodiments, enclosure 10 can be formed from conductive metals such as steel or aluminum, rigid conductive plastics, conductively plated plastics, and so forth. Enclosure 10 is connected to a building ground to provide a common ground for the whole cabinet.

An lattice or mesh (or screen) 18 of flexible, conducting wires is mounted to an annular conductive flange or base member 20 that is disposed within enclosure 10 to extend proximate to the perimeter of an inner periphery 24 of opening 22. Lattice 18 is formed by a plurality of interlaced frames of parallel, tensioned wires. The frames are angled apart from another and the interlaced wires of lattice 18 extend across opening 22 to maintain partial contact with adjacent crossing wires. Base member 20 may be recessed within enclosure 10, and will provide a surface against which the wires of lattice 18 may be tensioned. In exemplary embodiments, lattice 18 and base member 20 can comprise a nickel copper alloy such as Monel, tin-plated copper-clad steel, aluminum, beryllium copper, sponge or solid silicone, and so forth.

Figure 2:
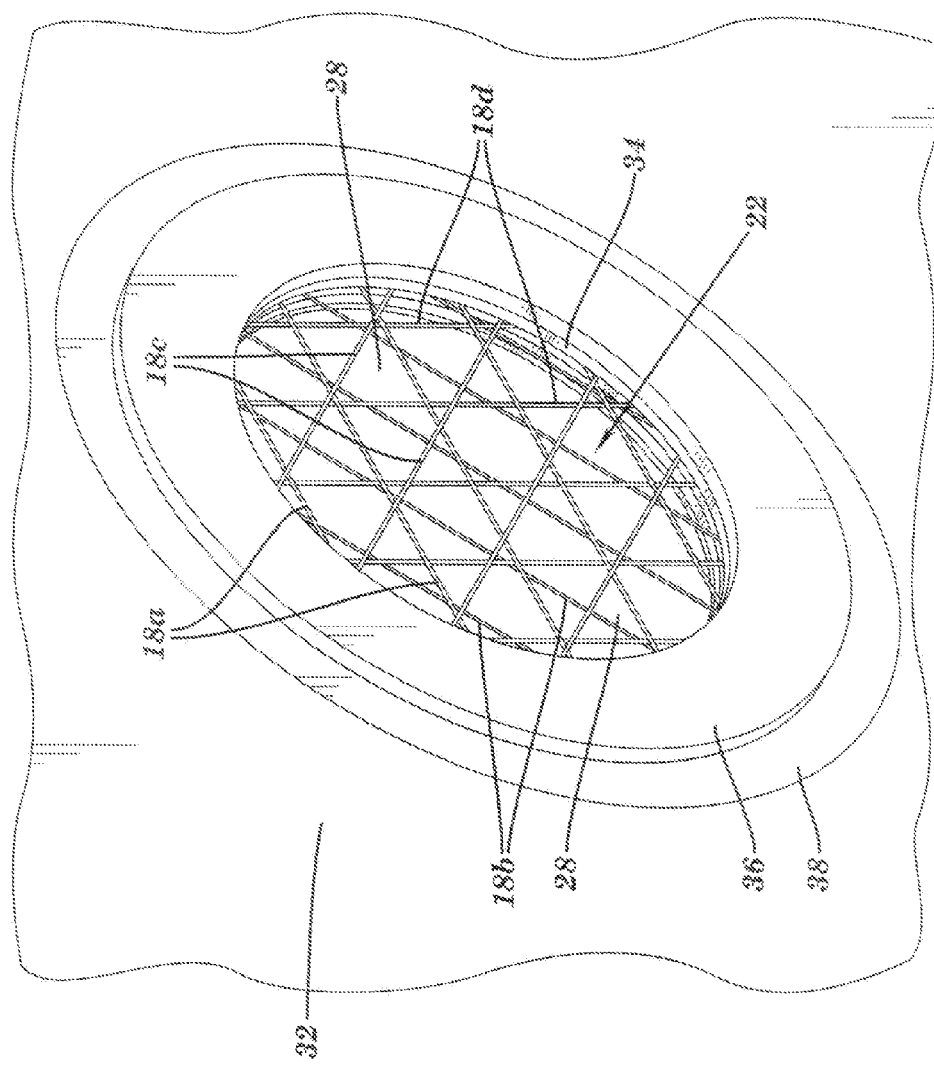
FIG. 2 is a close-up perspective view of the exemplary grounding enclosure of FIG. 1.
Figure 3:
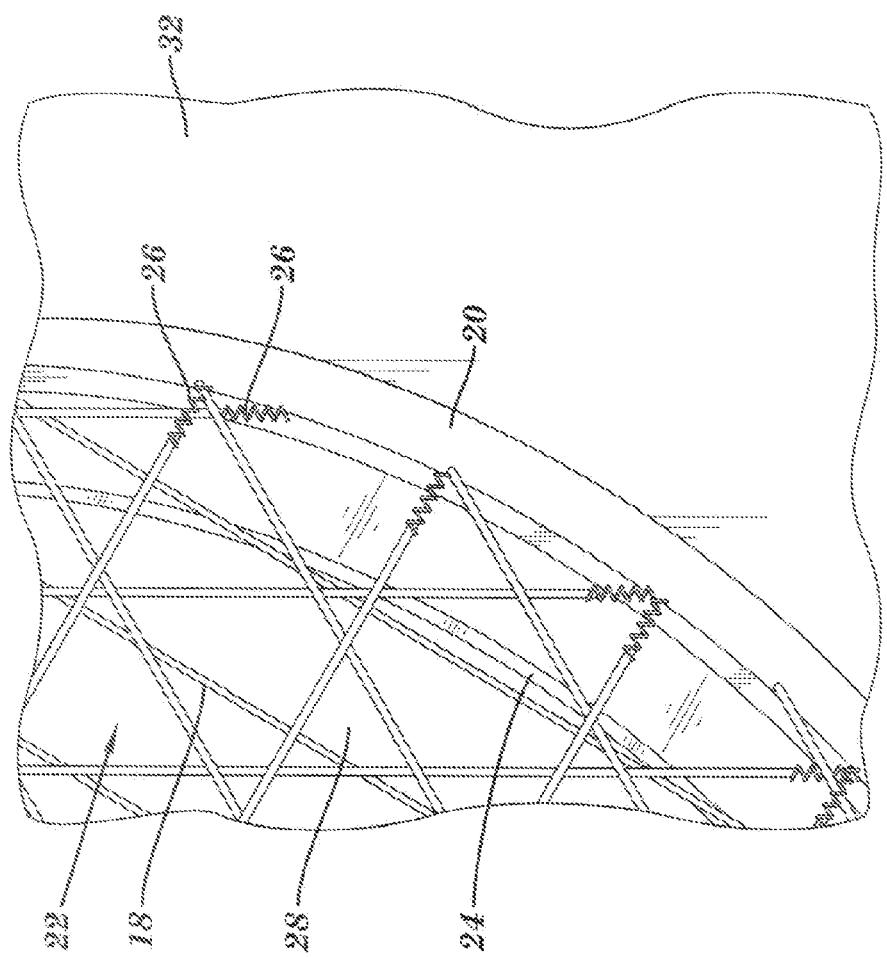
FIG. 3 is a partial exploded view of the exemplary grounding enclosure of FIG. 1.

For instance, in the present, non-limiting exemplary embodiment, lattice 18 is shown as being formed by four interlaced frames, labeled 18a, 18b, 18c, and 18d in FIG. 2, that are angled 45 degrees apart. Separate gaps 28 are thereby formed in lattice 18 by interlacing wire frames 18a, 18b, 18c, and 18d. It should be noted that lattice 18 can comprise any suitable number of frames of tensioned wires in alternative exemplary embodiments. As will be described, the interlaced wires of lattice 18 serve to provide a simple shield grounding connection to cables received in gaps 28 as the cables pass between system racks through enclosure 10, thereby preventing electromagnetic radiation from one rack from by-passing the enclosure and invading an adjacent rack. In exemplary embodiments in which lattice 18 comprises a greater number of interlacing wire frames that are offset at smaller angles, smaller gaps 28 and a greater number of wire-to-cable contact points can be achieved.

Figure 6:
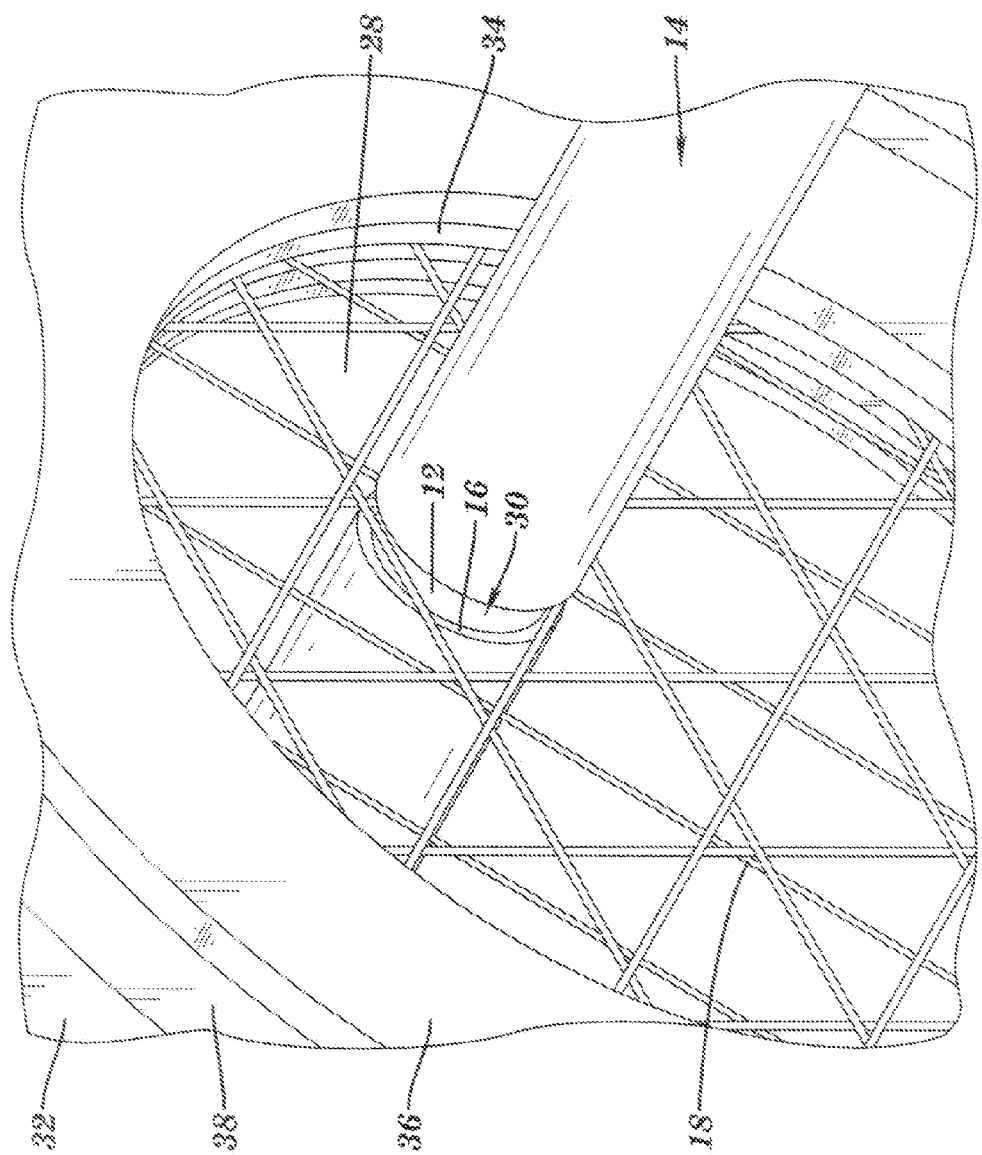
FIG. 6 is a close-up perspective view of the exemplary grounding enclosure of FIG. 1 having a cable passing therethrough.

In the present exemplary embodiment, as illustrated in FIG. 6, a non-end portion of outer insulating jacket 16 of cable 14 is stripped from the cable to form a groove 30 and expose a periphery of the underlying conductive shield 12. The stripping can be performed, for example, using known tools and techniques, and is performed on a portion of the cable that will be extending through opening 22 and lattice 18.

In the present exemplary embodiment, the lattice 18 is loaded in base 20 by springs 26 so that the wires are tensioned. In exemplary embodiments, springs 26 can be fastened to base member 20 using an adhesive, welding techniques, or mechanical fasteners, such as screws or auxiliary clamps (not shown).

In use, by spring-loading the wires of lattice 18 and providing gaps 28 with a cross-sectional area that is smaller than the cross-sectional area of cables 14 passing through opening 22, each cable passing through enclosure 10 can be individually installed in a respective gap by causing the wires defining that gap to flex outwardly to create a greater cross-sectional area for passing the cable through, then releasing the wires as the cable is passed through the gap so that the wires tension into groove 30 and couple about the cable at the stripped portion of the cable where the shield is exposed. As a result, the stripped portion of the cable will be disposed within the respective gap formed by lattice 18.

If the cross-sectional area of the respective gap is sized slightly smaller than the cross-sectional area of the stripped portion of the cable placed therethrough, the tensioned wires of lattice 18 can compress about the stripped portion of the cable to make continuous contact with the shield. In this manner, lattice 18 is configured to carry on continuous contact at multiple points with shields 12 of cables 14 passing through enclosure 10. Thus, lattice 18, once fastened about a cable, will serve to securely hold the stripped portion of the cable in position in a respective gap. The wires forming the respective gap will substantially surround the stripped portion of the cable so that the outer circumference of the stripped portion will be in continuous contact with a respective wire. Although there may be small contact openings between adjacent crossing wires, it is not believed that these small openings will allow for the passing of unacceptable electromagnetic radiation. In non-limiting exemplary embodiments, however, the stripped portion of a respective cable may be bonded to lattice 18 within the respective gap using a conductive adhesive to seal these small openings and help to provide a more secure connection between the cable and lattice 18.

Furthermore, lattice 18 may be used in this manner to couple to shield 12 along any portion of cable 14. By stripping cable 14 to form groove 30 at a desired location along the cable, a desired length of the cable may extend from either side of enclosure 10 to the adjacent racks, which can be useful in maintaining signal integrity. Consequently, exemplary embodiments of the present invention need not depend on enclosure 10 and/or opening 22 being disposed at a particular or specified location with respect to the rack subsystems. Additionally, the cables can be grounded outside of and separate from the housing and electrical connectors of the electrical components at which the cables terminate. In this manner, an electromagnetic radiation boundary of each electronic subsystem or device can be independently maintained.

Figure 4:
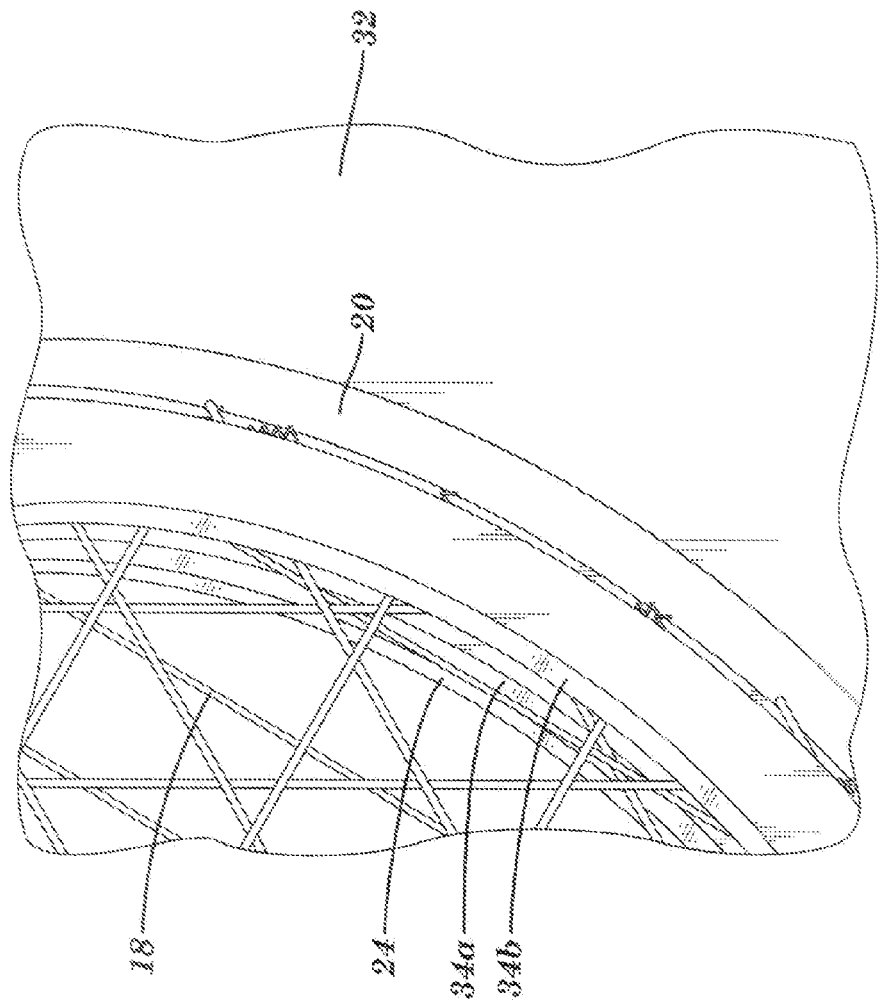
FIG. 4 is another partial exploded view of the exemplary grounding enclosure of FIG. 1.

Referring to FIG. 4, the present exemplary embodiment also includes an annular wire shielding gasket 34 circumferentially disposed proximate to the inner periphery of opening 22 and adjacent to base 20. Gasket 34 comprises a pair of continuous sections 34a, 34b in contact with either side of lattice 18 adjacent to springs 26. As illustrated, section 34a is disposed between lattice 18 and the interior region of enclosure 10 about opening 22 to make direct contact with both the lattice and the enclosure. Thus, gasket 34 serves to provide a conductive connection to ground for cables passing though lattice 18, as emissions from high-frequency current being conducted along a cable shield are directed to flow onto and through the lattice, then by-pass springs 26 and flow through gasket 34, and then ultimately to a ground potential through enclosure 10.

In exemplary embodiments, gasket 34 may comprise resilient knitted wire mesh strips, such as those typically used to provide shielding from electromagnetic interference at the joints and seams of electronic devices, and may be formed from an electrically conductive material such as, for example, beryllium copper or other stamped metal, elastomeric core, conductively loaded elastomers, wire mesh, metallized fabric bonded to foam, and so forth. In some exemplary embodiments, gasket 34 may be a tapered split-collar gasket formed from, for example, rigid, conductive plated metal, conductive unplated metal, or conductive plastic (for instance, copper, nickel-plated steel, stainless steel, etc.). In alternative exemplary embodiments, gasket 34 may be a tapered split-ring gasket formed from, for example, flexible conductive material, such as Ultra Vanshield EMI/RFI Shielding manufactured by Vanguard Products Corporation of Danbury, Conn., or another suitable material. In other alternative exemplary embodiments, gasket 34 may be formed from a conductive packing. For example, gasket 34 may be formed from packed conductive wool, such as bronze wool, steel wool, copper wool, or the like. In still further alternative exemplary embodiments, gasket 34 may be formed from a conductive, flexible, uniformly metallized fabric (for example, a nickel-plated fabric, silver-plated fabric, etc.) that is adhered to an underlying layer of foam (not shown), which may or may not be conductive. Because the fabric is conductive, shield 12 will be grounded to enclosure 18 via lattice 18 and the fabric. Examples of such conductive fabric and foam combinations are those manufactured by Laird Technologies.

Figure 5:
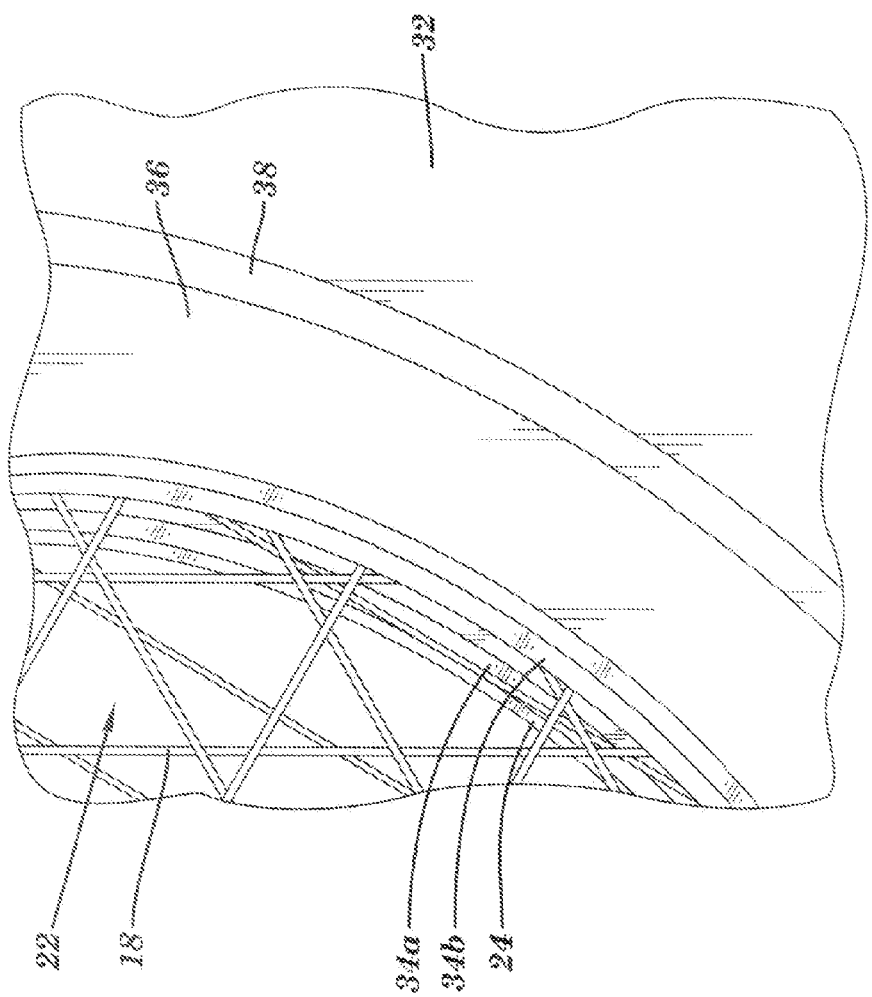
FIG. 5 is a close-up perspective view of the exemplary grounding enclosure FIG. 1.

Referring to FIG. 5, the present exemplary embodiment also includes an annular cover member 36 disposed adjacent and coupled to the interior surfaces of gasket section 34b, base member 20, and enclosure 10 about opening 22. An outer peripheral section 38 of cover member 36 may be adapted to fixedly couple to the inner surface of sidewall 32 and thereby provide a tight environmental seal by applying and maintaining a force on the entire inner circumference of gasket section 34b such that both sections of gasket 34 are forced against and remain in contact with the portion of lattice 18 to which the gasket is coupled and gasket section 34a is forced against and remains in contact with the section of inner periphery 24 of enclosure 10 to which it is coupled. In this manner, cover member 36 can operate to seal inner gasket section 34b so that electromagnetic leakage passing through gasket 34 is routed to enclosure 10, either directly through outer gasket section 36a or from the inner gasket section through the cover member to the enclosure, further ensuring that electromagnetic emissions are prevented from leaking past the stripped portion of cable 14. Because conductive enclosure 10 is coupled to a ground potential, electromagnetic emissions will be conducted, via the enclosure, to the ground potential.

In exemplary embodiments, cover 36 can be formed of metallic material such as aluminum, copper, or steel, conductively coated plastic alloys used in die casting, and so forth. Alternatively, cover 36 can be formed of any other electrically conductive or nonconductive material.

In exemplary embodiments, gasket 34 may be held in place by press fitting or frictionally retaining the gasket into electrical contact with lattice 18 and enclosure 10 using cover 36. In alternative exemplary embodiments, or in conjunction with the above, gasket 34 can be fastened to lattice 18 and/or enclosure 10 using, for instance, an adhesive, welding techniques, or mechanical fasteners, such as screws or auxiliary clamps (not shown). For consistency of electrical contact, gasket 34 can be configured to flex and/or compress to some degree to follow the dimensional variations of the surfaces of enclosure 10, lattice 18, and cover 36 to which the gasket is attached.

Therefore, in the present exemplary embodiment, with gasket 34 being forced into electrical contact with lattice 18 and enclosure 10, once the stripped portion of cable 14 is installed in and electrically contacts lattice 18, shield 12 of the cable will be electrically coupled to the enclosure and thus grounded. Electrical continuity thus exists from shield 12 to lattice 18 to gasket 34 to enclosure 10 to ground. In this context, as shown in FIG. 4, it is not necessary for base member 20 to make direct contact either enclosure 10 or gasket 34. Instead, in exemplary embodiments, the respective side edges of base member 20 may be separated from enclosure 10 and/or gasket 34 by a gap, and the base member may instead by only fixedly attached to cover 36, which has outer periphery 38 that is electrically connected to ground through enclosure 10.

Exemplary embodiments of the present invention thereby provide for EMC treatment of cables passing between adjacent racks of electrical components in a simple assembly of few components that require no additional support mechanisms for the cables other than those described. Exemplary embodiments can thus be used to prevent electromagnetic radiation emitted from an electrical component in one rack subsystem from being conducted along cabling to another rack subsystem and thereby adversely affecting the electrical components in the other subsystems. The configurations of opening 22 and lattice 18 may be adapted for routing any number of cables therethrough, and for any cable diameter and length and any number of signal leads.

The foregoing description discloses only exemplary embodiments of the invention. Modifications of the above disclosed apparatus and methods which fall within the scope of the invention will be readily apparent to those of ordinary skill in the art. Accordingly, while the present invention has been disclosed in connection with exemplary embodiments thereof, it should be understood that other embodiments may fall within the spirit and scope of the invention, as defined by the following claims.

What is claimed is:

1. An apparatus for grounding one or more cables, each cable having a cable jacket surrounding an electrically conductive layer, the electrically conductive layer of each cable including an exposed portion not covered by the cable jacket, the apparatus comprising:

an electrically conductive enclosure coupled to a ground potential and having an opening therethrough;

a plurality of electrical conductors disposed across the opening to form a lattice, the lattice being configured to receive the one or more cables therethrough such that the exposed portion of the electrically conductive layer of each cable makes electrical contact with at least one of the electrical conductors; and an electrically conductive connection, the connection being in electrical contact with the lattice and the enclosure such that the electrically conductive layer of each cable received through the lattice is electrically coupled to the ground potential through the lattice, the connection, and the enclosure.

2. The apparatus of claim 1, wherein the enclosure comprises an electrical cabinet configured to house one or more rack subsystems of electronic equipment.

3. The apparatus of claim 1, wherein the plurality of electrical conductors comprises a plurality of flexible conducting wires tensioned across the opening, the conducing wires being interlaced to form a plurality of gaps in the lattice, each gap of the plurality of gaps being defined by a respective set of conducting wires that are configured to flexibly fit about a cable received through the corresponding gap such that at least one of the conducting wires makes electrical contact with the exposed portion of the electrically conductive layer of the cable.

4. The apparatus of claim 1, further comprising a conductive base disposed within the enclosure and extending proximate to an inner periphery of the opening, the electrical conductors being tensioned across the opening from a surface of the base.

5. The apparatus of claim 4, wherein the lattice further comprises a plurality of springs connected to the surface of the base and tensioning the electrical conductors across the opening.

6. The apparatus of claim 4, wherein the lattice and the base are constructed from at least one of nickel copper alloy, tin-plated copper-clad steel, aluminum, beryllium copper, and silicone.

7. The apparatus of claim 5, wherein the connection comprises a wire shielding gasket disposed about the base and the plurality of springs of the lattice.

8. The apparatus of claim 7, wherein the gasket comprises is constructed from at least one of stamped metal, elastomeric core, conductively loaded elastomers, wire mesh, metallized fabric bonded to foam, and conductive packing.

9. The apparatus of claim 7, further comprising an annular cover disposed within the enclosure and fixedly coupled to the gasket, the base, and an interior surface of the enclosure, the cover being configured to maintain a force against the gasket such that the gasket maintains electrical contact with the lattice and the enclosure.

10. The apparatus of claim 9, wherein the cover comprises a metallic material or a plastic material.

11. A method for grounding a cable, the cable having a cable jacket and an electrically conductive layer surrounded by the cable jacket, the method comprising:

removing a portion of the cable jacket from the cable to expose a portion of the electrically conductive layer; and placing the cable through a lattice formed by a plurality of electrical conductors disposed across an opening such that the exposed portion of the electrically conductive layer of the cable makes electrical contact with at least one of the electrical conductors of the lattice, the opening being formed in an electrically conductive enclosure that is coupled to a ground potential, the lattice and the enclosure being electrically coupled by an electrically conductive connection such that the electrically conductive layer of each cable received through the lattice is electrically coupled to the ground potential through the lattice, the connection, and the enclosure.

12. The method of claim 11, wherein the plurality of electrical conductors comprises a plurality of flexible conducting wires tensioned across the opening, the conducing wires being interlaced to form a plurality of gaps in the lattice, and wherein placing the cable through the lattice comprises outwardly flexing open the conducting wires defining a respective gap of the plurality of gaps, placing the cable through the respective gap, and releasing the conducting wires to flexibly fit about the cable such that at least one of the conducting wires makes electrical contact with the exposed portion of the electrically conductive layer of the cable.

\* \* \* \* \*